United States Patent [19]

Eldridge

[11] Patent Number: 5,472,484
[45] Date of Patent: Dec. 5, 1995

[54] OIL-SPILL MARKING COMPOSITION

[75] Inventor: Kevin T. Eldridge, Cheshire, Conn.

[73] Assignee: Midsun Group, Southington, Conn.

[21] Appl. No.: 323,824

[22] Filed: Oct. 17, 1994

Related U.S. Application Data

[62] Division of Ser. No. 95,855, Jul. 23, 1993, Pat. No. 5,356,465.

[51] Int. Cl.$^6$ ................................................... C09D 11/00
[52] U.S. Cl. .................. 106/21 A; 106/20 A; 106/22 B; 106/19 B
[58] Field of Search .......................... 106/21 A, 20 A, 106/22 B, 19 B

[56] References Cited

U.S. PATENT DOCUMENTS

| | | | |
|---|---|---|---|
| 3,672,842 | 6/1972 | Florin | 106/21 A |
| 3,960,755 | 6/1976 | Beachem et al. | 106/21 A |
| 4,015,131 | 3/1977 | McDonough et al. | 106/21 A |
| 4,171,982 | 10/1979 | Lin | 106/21 A |
| 4,186,020 | 1/1980 | Wachtel | 106/21 A |
| 4,605,441 | 8/1986 | Masuda et al. | 106/21 A |
| 4,610,806 | 9/1986 | Rosen | 106/21 A |
| 4,631,084 | 12/1986 | Sagawa | 106/21 R |
| 4,822,417 | 4/1989 | Kobayashi et al. | 106/26 R |
| 5,082,495 | 1/1992 | Iijima et al. | 106/20 A |
| 5,250,108 | 10/1993 | Tanaka et al. | 106/21 A |

*Primary Examiner*—Helene Klemanski
*Attorney, Agent, or Firm*—Ira S. Dorman

[57] ABSTRACT

A method for visibly marking an area contaminated with transformer oil or other organic liquid uses a marking composition that consists of a colorant held within a solid carrier material, the colorant being such as to effect a visibly perceptible change upon contact with the organic liquid. The carrier material may be an absorbent that permits delivery of the colorant through capillary action, or the colorant may be encapsulated by a cell-forming matrix material that interacts with the contaminating liquid to effect release.

16 Claims, No Drawings

OIL-SPILL MARKING COMPOSITION

This is a divisional of application Ser. No. 08/095,855, filed on Jul. 23, 1993, now U.S. Pat. No. 5,356,465.

BACKGROUND OF THE INVENTION

The inability to quickly conveniently and accurately define the extent of ground contamination resulting from spills of oil and other organic liquids greatly hampers compliance with existing mandates for cleanup of affected areas. The problem is exacerbated when the area is wet, or when the spill is masked by irregular ground features such as grass, mulch, or the like.

Present practices normally entail time-consuming and expensive statistical sampling and analysis techniques, both initially and also during the cleanup process. Methods have been developed which rely upon fluorescence under ultraviolet light to discriminate contaminated areas from the surroundings, based upon differences in radiation absorption, but they are found to be of only limited effectiveness and utility. A substantial need remains therefore for means by which the extent of organic liquid contamination of ground surfaces can be determined readily, effectively and with precision.

SUMMARY OF THE INVENTION

Accordingly, it is an object of the present invention to provide a novel method by which areas contaminated with organic liquids can visibly be marked for ready identification.

It is also an object of the invention to provide a novel marking composition and system for use in such a method.

A more specific object is to provide such a method and composition whereby areas that are so contaminated can be distinguished from contiguous areas that are not, notwithstanding ground wetness and irregular surface features.

It has now been found that certain of the foregoing and related objects of the invention are attained by the provision of a method in which a marking composition is distributed over an area that is suspected of contamination. The marking composition is comprised of a colorant held within a solid carrier material, which material is interactive with the organic liquid for effecting direct contact of the colorant therewith so as to effect a visibly perceptible change.

The colorant will normally be oil-soluble as well as being soluble in the contaminating organic liquid; for example, to enable effective cleanup of electrical transformer oil spills the colorant will be soluble in dielectric mineral oils which may or may not comprise polychlorinated biphenyl (PCB) compounds. Preferably, the marking composition will further comprise an oil vehicle in which the colorant is dissolved, typically containing 5 to 25 percent of colorant based upon the total weight of the colorant composition. The oil vehicle will most desirably have a surface energy in the range 40 to 60 dynes/cm$^3$, and will be of such composition that no more than 10 percent by weight of water will be soluble in the oil.

To ensure adequate discrimination under lighting in the visible wavelength range, there should be at least a 20 percent difference between the Pantone color value of the marking composition before and after it is contacted with the organic liquid; also, the Pantone color value of the marking composition should be no more than about 10 percent of the Pantone color value of the colorant composition. The colorant will normally be water-insoluble, and a quantity of surfactant may be included in the composition to promote the affinity of the colorant for the organic liquid contaminant (and conversely, to make it more hydrophobic).

The marking composition may be provided in a finely divided dry form (e.g., as a powder), in which case its distribution may be effected by mechanical, pneumatic or manual means. A composition in such form may also be admixed with water, typically in a weight ratio of water to solids (marking composition) in the range 1.0 to 3.0:1.0, for distribution by spraying.

In those instances in which the colorant composition is absorbed on the carrier, the weight ratio of the carrier to the colorant composition will advantageously be in the range 25 to 60:1.0, but usually not exceeding 40:1.0. The carrier may alternatively be in the form of a microencapsulating matrix of cells (normally having a diameter of at least about 60 microns) containing the colorant composition. The matrix-forming material will be hydrophobic and water-insoluble, and the oil vehicle used in such instances will be capable of taking up no more than about 2 percent by weight of water. A macroencapsulating carrier may also be employed, in which case the material of which the cell-forming matrix is produced will, by the nature of macroencapsulation, be fusible at temperatures above ambient.

The colorant may be of such character that the perceptibility of the change that occurs is enhanced in response to radiation outside of the visible range, in which case the method will further comprise the step of exposing the treated area to radiation of appropriate wavelength, typically in the ultraviolet spectral region. Mixtures of colorants may also be used, such as to render the marking composition specific in its response to certain contaminants or lighting conditions, or indeed to provide more complete information about the nature of a spill.

Other objects of the invention are attained by the provision of the marking composition described. And yet further objects are attained by the provision of a marking system, also as described herein.

DETAILED DESCRIPTION OF THE PREFERRED EMBODIMENTS

Illustrative of the efficacy of the present invention are the following specific examples, wherein all percentages and ratios specified are on a weight basis:

Example One

A quantity of colorant composition, commercially available from Becker-Underwood, Inc. under the trade designation BAS-OIL RED, is placed into a vibrating container; the BAS-OIL RED product is a solution of 23.52 percent of Solvent Red 164 in 30 percent of a petroleum hydrocarbon oil, the balance being a proprietary naphthenic distillate. An absorbent acrylate copolymer powder, commercially available from Dow Corning Corporation under the name POLYTRAP Q5-6603, is added to and intimately mixed with the colorant liquid in an amount sufficient to produce a dry, powdery material with a strong, whitish-pink shading; the weight ratio of absorbent to colorant solution is about 35:1.

An oil spill is simulated by pouring transformer oil onto a grassy area of ground, and the absorbent material prepared as above is distributed from a Hudson duster to cover the contaminated area, and beyond. The dry powder in contact with the oil is found to have turned a brilliant red, while the surrounding material maintains its original color; the contaminated area is thereby clearly demarcated.

Example Two

The foregoing Example is repeated, utilizing however an oil-soluble, yellow-green fluorescent dye composition in place of the BAS-OIL RED dye. The fluorescent dye product is commercially available from UVP, Inc. under the name REVEAL A-680 OIL ADDITIVE, and is reported to contain 8 percent of dye (the specific chemical identity of which is withheld by the manufacturer as a trade secret), 25 percent of "hydrotreated" naphthenic oil, and 67 percent of mineral oil; it is incorporated into the POLYTRAP powder in the manner hereinabove described and in about the same amount.

The resultant material is distributed over a transformer oil spill, following which no clear color change is evident. Upon exposure of the vicinity to ultraviolet (365 nanometers) light, however, a bright yellow-green glow is observed in the area contaminated by the oil; the marking composition on the surrounding margins does not glow, and once again the affected area is clearly demarcated.

Example Three

Example One is again repeated, using however an equal-parts mixture of the dye compositions employed therein and in Example Two. The resultant marking composition functions to identify an oil spill in both daylight and also at night, the latter under UV irradiation.

As will be appreciated from the foregoing description, the marking composition provided and employed in the practice of the present invention may take a variety of forms. The colorant composition may be absorbed into the carrier, or it may be encapsulated within cells formed by a matrix material, the latter in either a microencapsulated or macroencapsulated form; other kinds of carriers suitable for use herein may occur to those skilled in the art as well. In any case, the carrier material must be interactive with the organic liquid constituting the contamination that is to be marked, which interaction can occur through either physical or chemical mechanisms.

In those instances in which the colorant is absorbed in the carrier, contact between the organic liquid and the colorant will of course be effected by capillary action. Where, on the other hand, the colorant is encapsulated the mechanism entailed may be one of either dissolution or physical disintegration of the carrier cell walls, or chemical reaction with the organic liquid contaminant, depending upon the nature of both the matrix-forming material and also the organic liquid.

In addition to the factors previously discussed, it should be emphasized that the properties of the colorant composition, and particularly of the oil that is utilized to dissolve the dye or other colorant, are of primary importance to the effectiveness of an absorbent-based marking composition. In general, the oil should be similar to the contaminating organic liquid in molecular weight, solubility characteristics, surface tension, surface energy, density of any cross-linking present, etc.; vapor pressure differentials may also affect performance. Moreover, the solubility of water in the oil of the colorant composition must be low, not only to prevent the dry powder from becoming unduly colored prior to exposure to an organic contaminant, but also to ensure that a clear demarcation is achieved between the contamination and any adjacent areas that may be wet. More particularly, the colorant oil should be capable of dissolving no more than 10 percent, and preferably less than 2 percent of water, based upon its own weight.

The absorbent carrier itself may constitute any suitable synthetic or natural, organic or inorganic molecular sieve material. Exemplary substances include sodium zirconia silica, activated alumina, aluminum silicate (in hydrated and nonhydrated forms), calcium aluminum silicate, diatomite, activated carbon, precipitated silica, and polyester and polymethacrylate resins (e.g., the POLYTRAP product used above) in suitable form.

Hot-melt resins and water-based wax emulsions can be used to form matrices for macroencapsulation of colorant compositions. Both kinds of materials are capable of fusion at temperatures above ambient, but it should be appreciated that the colorant-delivery mechanism will not depend upon that property. In addition to being capable of encapsulating colorants in oil solution, macroencapsulation systems may contain solid colorants as well as water-soluble dyes in aqueous solution (about 5 to 60 percent dye concentration), which solutions may have a surface energy in the range 30 to 70 dynes/cm$^3$.

A wide variety of materials can also be employed for microencapsulating the colorant composition, including for example cellulose derivatives, gelatin, carrageenan, polyamides, acrylic resins, polyesters, polyurethanes, ethylene vinyl acetates, polysulfones, polycarbonates, polyphenylene oxides, urea-melamine and urea-resorcinol formaldehyde resins, polyvinyl alcohol resins, polyacrylamines, and polyvinyl pyrrolidone resins. It will be appreciated that the encapsulating matrices must be water-insoluble and hydrophobic; they will normally have cells of at least 60 microns in diameter, and typically the cell size will not exceed 150 microns.

As previously mentioned, it is important that the carrier be capable of hiding the dye composition color sufficiently to ensure that a perceptible change is exhibited when the colorant comes into contact with the organic contaminant. This has been expressed above in terms of Pantone color values, the standards of which are well known to those skilled in the art. In addition to consideration of the inherent properties of the carrier and the dye composition, moreover, overloading of an absorbent carrier with dye can produce excessive coloration, and thereby limit the ability of the marking composition to function as intended.

It should perhaps be pointed out that, as used herein, the term "colorants" is intended to encompass both dyes and pigments. Moreover, the term includes substances that respond to radiation outside of the visible range of wavelengths, as by exhibiting fluorescence under UV light, in which instances color density criteria analogous to the Pantone color values referred to above may be applied.

It will be understood that various modes of application of the marking composition are feasible, and that the choice will depend upon the location and extensiveness of the oil spill, as well as upon factors. Dry spreading may be suitable in certain instances, but would not usually be the technique of choice; delivery as an aerosol, or as a sprayed aqueous suspension or mixture, will generally be preferred. The ingredients and form of the marking composition may be tailored to the particular manner of distribution, as well as to the specific contamination entailed. Although transformer oil has been specifically mentioned, environmental problems arise of course from many other organic liquids, such as for example gasoline, industrial solvents, motor oil, and the like, and it is self evident that the instant method and composition are equally applicable thereto.

Thus, it can be seen that the present invention provides a novel method by which areas contaminated with organic liquids can be marked visibly for ready identification, and can be distinguished from contiguous areas notwithstanding ground wetness and irregular surface features. The invention also provides a novel marking composition and system for use in carrying out the method.

Having thus described the invention, what is claimed is:

1. A marking composition, for visibly marking an area contaminated with an organic liquid, comprising a colorant composition held within a solid carrier material, said colorant composition being capable of effecting a visibly perceptible change upon contact with an organic liquid, and comprising an oil vehicle having a surface energy in the range 40 to 60 dynes/cm$^3$, and 5 to 25 percent, based upon the weight of said colorant composition, of an oil-soluble colorant dissolved in said oil vehicle, said oil vehicle being of such composition that no more than 10 percent by weight of water is soluble therein; said carrier material being in finely divided form interactive with the same organic liquid for effecting direct contact of said colorant composition therewith, and said marking composition having a Pantone color value that is no more than about 10 percent of the Pantone color value of said colorant composition.

2. The marking composition of claim 1 wherein said colorant composition is absorbed on said carrier, and wherein the weight ratio of said carrier to said colorant composition is in the range 25 to 60:1.0.

3. The marking composition of claim 1 wherein said colorant composition further includes a quantity of surfactant for promoting the affinity of said colorant for said organic liquid.

4. The marking composition of claim 1 wherein said carrier material is a powder.

5. The marking composition of claim 1 in the form of microcapsules, said carrier constituting a matrix of cells having a diameter of at least about 60 microns and said colorant composition being contained in said cells, the material of which said matrix is formed being hydrophobic and water-insoluble, and said oil vehicle being of such composition that no more than 2 percent by weight of water is soluble therein.

6. The marking composition of claim 1 wherein said colorant composition is such that the perceptibility of said perceptible change is enhanced in response to radiation outside of the visible range.

7. The marking composition of claim 1 wherein said colorant composition comprises at least two different colorants.

8. A marking system for use in visibly marking an area contaminated with an organic liquid, comprising the marking composition of claim 1 admixed with water in a weight ratio of water to marking composition in the range 1.0 to 3.0:1.0.

9. A marking composition, for visibly marking an area contaminated with an organic liquid, comprising a colorant composition held within a solid carrier material, said colorant composition being capable of effecting a visibly perceptible change upon contact with an organic liquid, and comprising an oil vehicle having a surface energy in the range 40 to 60 dynes/cm$^3$, and 5 to 25 percent, based upon the weight of said colorant composition, of an oil-soluble colorant dissolved in said oil vehicle, said oil vehicle being of such composition that no more than 10 percent by weight of water is soluble therein; said carrier material being in finely divided form and interactive with the same organic liquid for effecting direct contact of said colorant composition therewith.

10. The marking composition of claim 9 wherein said colorant composition is absorbed on said carrier, and wherein the weight ratio of said carrier to said colorant composition is in the range 25 to 60:1.0.

11. The marking composition of claim 9 wherein said colorant composition further includes a quantity of surfactant for promoting the affinity of said colorant for said organic liquid.

12. The marking composition of claim 9 wherein said carrier material is a powder.

13. The marking composition of claim 9 in the form of microcapsules, said carrier constituting a matrix of cells having a diameter of at least about 60 microns and said colorant composition being contained in said cells, the material of which said matrix is formed being hydrophobic and water-insoluble, and said oil vehicle being of such composition that no more than 2 percent by weight of water is soluble therein.

14. The marking composition of claim 9 wherein said colorant composition is such that the perceptibility of said perceptible change is enhanced in response to radiation outside of the visible range.

15. The marking composition of claim 9 wherein said colorant composition comprises at least two different colorants.

16. A marking system for use in visibly marking an area contaminated with an organic liquid, comprising the marking composition of claim 9 admixed with water in a weight ratio of water to marking composition in the range 1.0 to 3.0:1.0.

* * * * *